(12) United States Patent
Watanabe

(10) Patent No.: US 11,656,826 B2
(45) Date of Patent: May 23, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Tetsuya Watanabe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 380 days.

(21) Appl. No.: 16/852,520

(22) Filed: Apr. 19, 2020

(65) Prior Publication Data
US 2021/0103417 A1    Apr. 8, 2021

(30) Foreign Application Priority Data
Oct. 8, 2019    (JP) .............................. JP2019-185293

(51) Int. Cl.
G06F 3/14    (2006.01)
(52) U.S. Cl.
CPC ...................... G06F 3/14 (2013.01)
(58) Field of Classification Search
CPC ........................................................ G06F 3/14
See application file for complete search history.

(56) References Cited

U.S. PATENT DOCUMENTS

| 10,909,024 B2* | 2/2021 | Li ................. G06F 11/3688 |
| 2006/0089837 A1* | 4/2006 | Adar ..................... G06Q 20/04 705/305 |
| 2011/0037742 A1* | 2/2011 | Suh ........................ G09F 9/301 345/211 |
| 2018/0331991 A1* | 11/2018 | Kim ................... G06F 3/04883 |

FOREIGN PATENT DOCUMENTS

JP    2006252347    9/2006

* cited by examiner

Primary Examiner — Samantha (Yuehan) Wang
(74) Attorney, Agent, or Firm — JCIPRNET

(57) ABSTRACT

An information processing apparatus includes a processor configured to perform control for displaying a first screen for receiving a change of setting of processing and an execution instruction of the processing, cause the screen to transition while maintaining first setting that is setting changed on the first screen, and perform notification that the first setting is changed upon receiving the execution instruction of the processing is received on the first screen in a case where a transition from the first screen to a second screen for receiving a change of second setting related to the processing or from the first screen to the second screen for receiving processing different from the processing received on the first screen is made during a period from the change of the first setting to reception of the execution instruction of the processing received on the first screen.

20 Claims, 17 Drawing Sheets

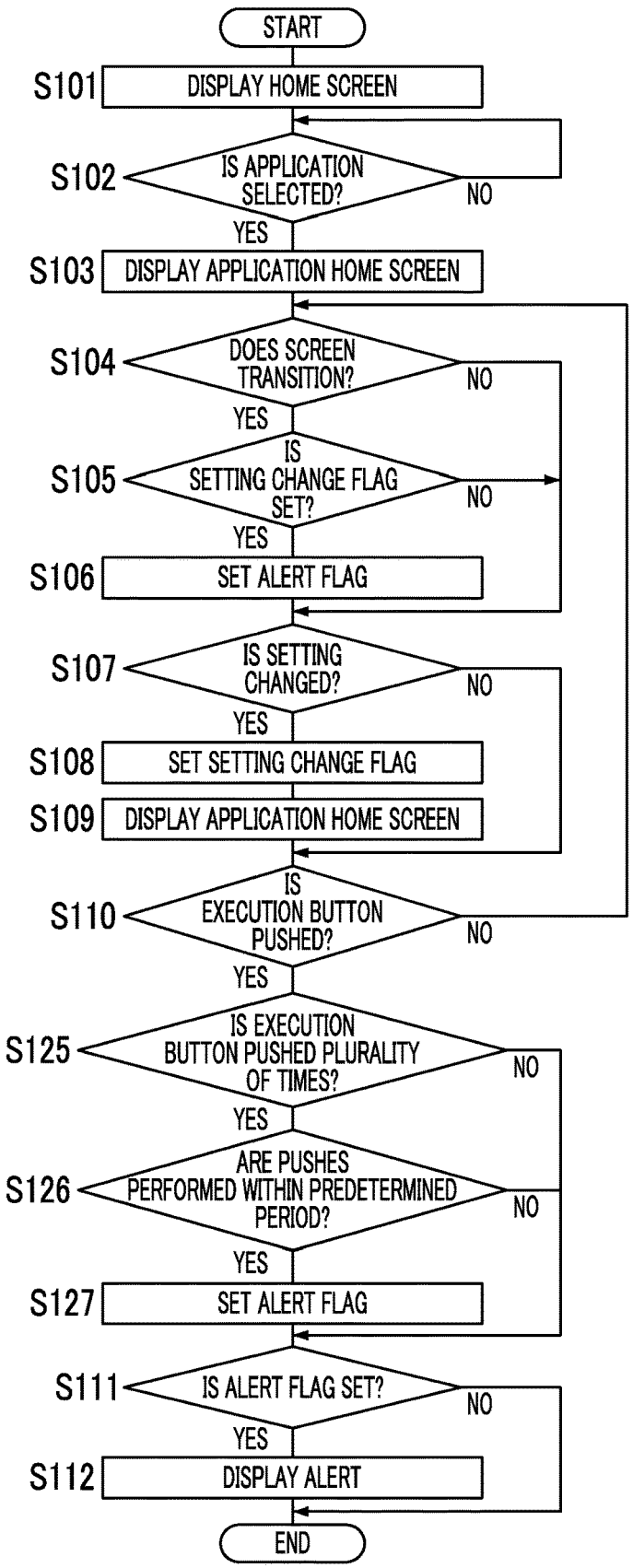

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-185293 filed Oct. 8, 2019.

BACKGROUND

(i) Technical Field

The present invention relates to an information processing apparatus and a non-transitory computer readable medium storing an information processing program.

(ii) Related Art

A portable terminal includes a display unit that displays a screen configured with an animation, an operation key for selecting a display item displayed on the screen, a control unit that performs control for displaying a screen configured with a new animation corresponding to the display item which is selected in accordance with a selection instruction using the operation key by pointing a cursor to the display item, and a storage unit that stores information related to the selected display item and/or information related to a display position of the selected display item. When the screen at the time of the selection instruction is displayed again by closing the screen configured with the new animation, the control unit displays the screen by pointing the cursor to the selected display item based on the stored information.

SUMMARY

In a terminal such as a smartphone and a personal computer having a plurality of applications or functions, the plurality of applications or functions may be operated in parallel by switching display of a screen. In this terminal, setting of each application or function may be stored even in a case where the application or the function is not displayed anymore by switching the display of the screen.

For example, the setting may be stored in a case where a transition is made from an application of which setting is changed to another application and then, a return is made to the application of which setting is changed. In this case, in the application before the transition, operation may be performed without recognizing the change of setting performed before the transition to the other application, and erroneous operation may be caused.

Aspects of non-limiting embodiments of the present disclosure relate to an information processing apparatus and a non-transitory computer readable medium storing an information processing program that are capable of reducing erroneous operation in a case of making a screen transition after setting is changed on a certain screen and returning to the screen on which the setting is changed, compared to a case where a user is not notified that the setting is changed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform control for displaying a first screen for receiving a change of setting of processing and an execution instruction of the processing, cause the screen to transition while maintaining first setting that is setting changed on the first screen, and perform notification that the first setting is changed upon receiving the execution instruction of the processing is received on the first screen in a case where a transition from the first screen to a second screen for receiving a change of second setting related to the processing or from the first screen to the second screen for receiving processing different from the processing received on the first screen is made during a period from the change of the first setting to reception of the execution instruction of the processing received on the first screen.

BRIEF DESCRIPTION OF THE DRAWINGS

Exemplary embodiment(s) of the present invention will be described in detail based on the following figures, wherein:

FIG. 18 is a flowchart illustrating one example of information processing according to the eighth exemplary embodiment.

DETAILED DESCRIPTION

First Exemplary Embodiment

Hereinafter, exemplary embodiments of the technology of the present disclosure will be described in detail with reference to the drawings. For example, an information processing apparatus 1 according to this exemplary embodiment will be described in the form of a multifunction peripheral having functions such as a print function, a copy function, a scan function, and a facsimile function. However, the present disclosure is not limited thereto. The information processing apparatus 1 may be a terminal such as a personal computer, a mobile phone, and a tablet or a server managing data and the like.

Figure 1:
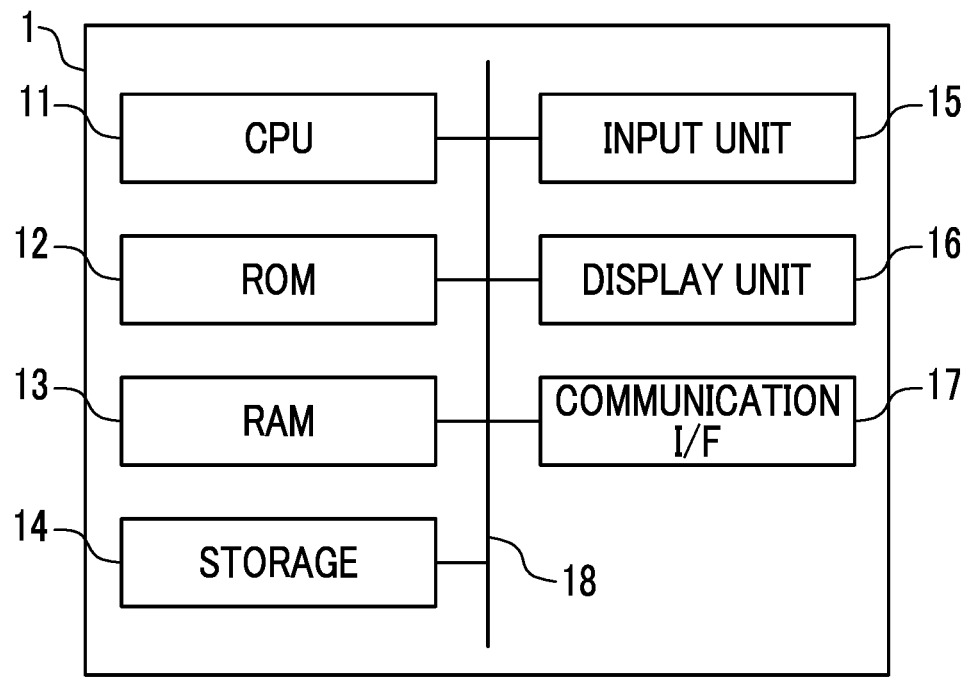
FIG. 1 is a block diagram illustrating one example of a hardware configuration of an information processing apparatus according to each exemplary embodiment.

FIG. 1 is a block diagram illustrating one example of a hardware configuration of the information processing apparatus 1 according to this exemplary embodiment. As illustrated in FIG. 1, the information processing apparatus 1 according to this exemplary embodiment is configured to include a central processing unit (CPU) 11, a read only memory (ROM) 12, a random access memory (RAM) 13, a storage 14, an input unit 15, a display unit 16, and a communication interface (communication I/F) 17. The CPU 11, the ROM 12, the RAM 13, the storage 14, the input unit 15, the display unit 16, and the communication I/F 17 are connected to each other through a bus 18.

The CPU 11 manages and controls the entire information processing apparatus 1. The ROM 12 stores various programs including an information processing program used in this exemplary embodiment, data, and the like. The RAM 13 is a memory that is used as a work area at the time of executing various programs. The CPU 11 performs processing of detecting and notifying a change by loading the program stored in the ROM 12 into the RAM 13 and executing the program. The storage 14 is, for example, a hard disk drive (HDD), a solid state drive (SSD), or a flash memory. The storage 14 may store the information processing program and the like. The input unit 15 includes a keyboard, a mouse, and the like that receive inputs of screen operation and the like. The display unit 16 is a monitor or the like that displays a screen or the like on which input and notification are performed. The communication I/F 17 transmits and receives data.

Figure 2:
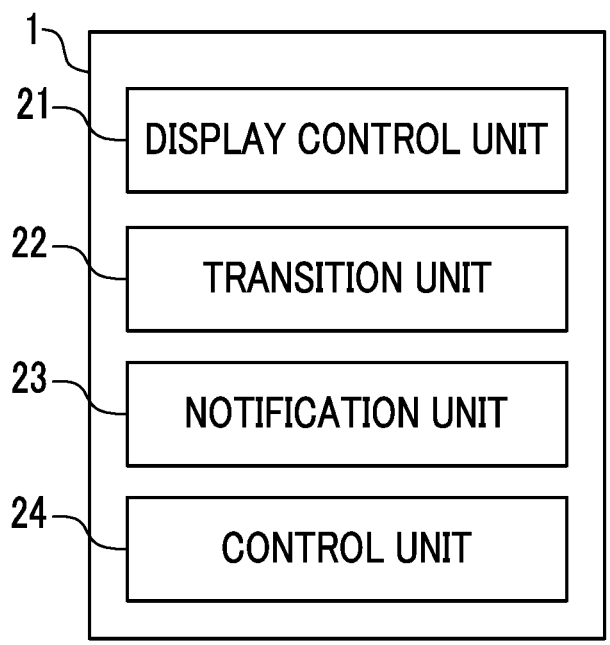
FIG. 2 is a block diagram illustrating one example of a functional configuration of the information processing apparatus according to each exemplary embodiment.

Next, a functional configuration of the information processing apparatus 1 will be described. FIG. 2 is a block diagram illustrating one example of a functional configuration of the information processing apparatus 1 according to this exemplary embodiment.

As illustrated in FIG. 2, the information processing apparatus 1 includes a display control unit 21, a transition unit 22, a notification unit 23, and a control unit 24. The CPU 11 functions as the display control unit 21, the transition unit 22, the notification unit 23, and the control unit 24 by executing the information processing program.

The display control unit 21 performs control for displaying a screen on which a change of setting of processing and an execution instruction of processing are received. The screen on which the change of setting of processing and the execution instruction of processing are received is one example of a first screen.

The transition unit 22 causes the screen to transition while maintaining the setting changed on the first screen. The setting changed on the first screen is one example of first setting.

In a case where the execution instruction of processing is received on the first screen, the notification unit 23 performs notification that the first setting is changed in a case where an alert flag is set.

The control unit 24 sets the alert flag in a case where a transition is made from the first screen to a second screen on which a change of second setting related to processing is received during a period from the change of the first setting to the reception of the execution instruction of processing received on the first screen. The control unit 24 sets the alert flag in a case where a transition is made from the first screen to the second screen on which processing different from processing received on the first screen is received during a period from the change of the first setting to the reception of the execution instruction of processing received on the first screen.

The control unit 24 does not set the alert flag in a case where the setting is not changed on the first screen or a transition is made to the second screen without maintaining the first setting. In addition, the alert flag is set in a case where an operation performed by a different user is detected during a period from the change of the first setting to the reception of the execution instruction of processing received on the first screen. For example, the case where an operation performed by a different user is detected is a case where verification of the user is performed during a period from the change of the first setting to the reception of the execution instruction of processing.

The control unit 24 does not set the alert flag in a case where a change of setting is confirmed. Even in a case where a change of setting is confirmed, the control unit 24 sets the alert flag in a case where predetermined setting is changed. In addition, the control unit 24 sets the alert flag in a case where identical setting is changed a plurality of times or the execution instruction of processing is performed a plurality of times within a predetermined period. In a case where the execution instruction of processing is received on the first screen, the control unit 24 does not set the alert flag for setting changed on the second screen.

Specifically, the control unit 24 sets a setting change flag in a case where the first setting is changed, and sets the alert flag in a case where the setting change flag is set in the case of a transition to the second screen. That is, the control unit 24 determines whether or not the setting change flag is set and sets the alert flag in a case where the setting change flag is set. In a case where the alert flag is set, the notification unit 23 performs notification of an alert.

Figure 3:
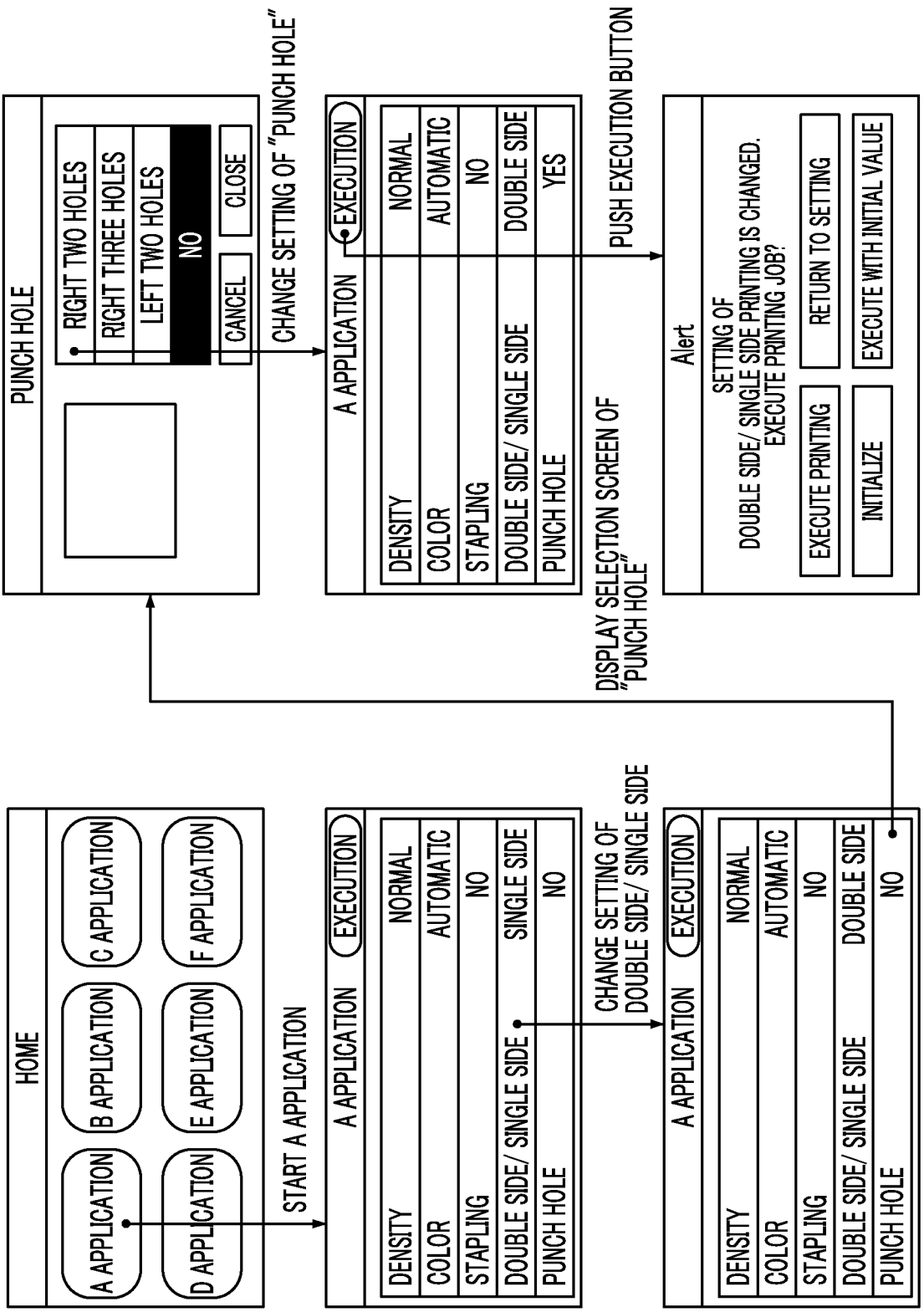
FIG. 3 is a schematic diagram illustrating one example of a screen provided in description of screen operation according to a first exemplary embodiment.

Next, a specific example of the screen operation will be described with reference to FIG. 3 before description of an effect of the information processing apparatus 1. FIG. 3 is a schematic diagram illustrating one example of a screen provided in description of the screen operation according to this exemplary embodiment. For example, as illustrated in FIG. 3, the information processing apparatus 1 has a plurality of applications.

In a case where an A application is selected, the information processing apparatus 1 starts the A application and displays an A application home screen. For example, in a case where "double side/single side" is selected, the information processing apparatus 1 changes setting of "double side/single side". The information processing apparatus 1 sets the setting change flag.

Furthermore, in a case where "punch hole" is selected, the information processing apparatus 1 causes the screen to transition by displaying a setting screen of "punch hole". The information processing apparatus 1 determines whether or not the setting change flag is set and sets the alert flag in a case where the setting change flag is set.

In a case where "right two holes" is selected and setting of "punch hole" is changed on the setting screen of "punch hole", the information processing apparatus 1 causes the screen to transition by displaying the A application home screen. In a case where "execution" is pushed, the information processing apparatus 1 determines whether or not the alert flag is set and performs notification that setting of the A application is changed in a case where the alert flag is set.

Figure 4:
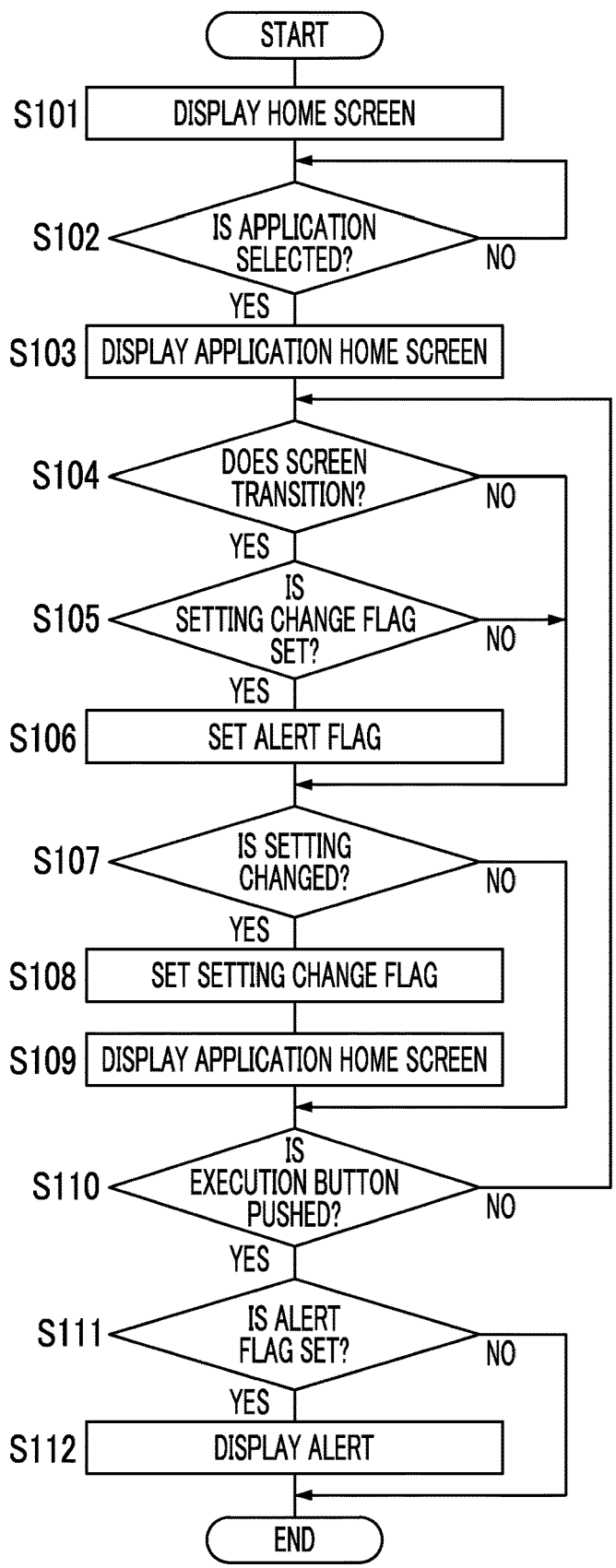
FIG. 4 is a flowchart illustrating one example of information processing according to the first exemplary embodiment.

Next, an effect of the information processing program according to this exemplary embodiment will be described with reference to FIG. 4. First, FIG. 4 is a flowchart illustrating one example of information processing according to this exemplary embodiment. The information processing illustrated in FIG. 4 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 4 is executed.

In step S101, the CPU 11 displays a home screen.

In step S102, the CPU 11 determines whether or not an application is selected on the home screen. In a case where an application is selected on the home screen (step S102: YES), the CPU 11 transitions to step S103. In a case where an application is not selected on the home screen (step S102: NO), the CPU 11 waits until an application is selected on the home screen.

In step S103, the CPU 11 displays a home screen of the selected application.

In step S104, the CPU 11 determines whether or not a button is pushed and a screen transition is made. In the case of making a screen transition (step S104: YES), the CPU 11 transitions to step S105. In the case of not making a screen transition (step S104: NO), the CPU 11 transitions to step S107.

In step S105, the CPU 11 determines whether or not the setting change flag is set. In a case where the setting change flag is set (step S105: YES), the CPU 11 transitions to step S106. In a case where the setting change flag is not set (step S105: NO), the CPU 11 transitions to step S107.

In step S106, the CPU 11 sets the alert flag.

In step S107, the CPU 11 determines whether or not to change setting. In the case of changing setting (step S107: YES), the CPU 11 transitions to step S108. In the case of not changing setting (step S107: NO), the CPU 11 transitions to step S110.

In step S108, the CPU 11 sets the setting change flag.

In step S109, the CPU 11 displays the home screen of the application.

In step S110, the CPU 11 determines whether or not an execution button is pushed. In a case where the execution button is pushed (step S110: YES), the CPU 11 transitions to step S111. In a case where the execution button is not pushed (step S110: NO), the CPU 11 transitions to step S104.

In step S111, the CPU 11 determines whether or not the alert flag is set. In a case where the alert flag is set (step S111: YES), the CPU 11 transitions to step S112. In a case where the alert flag is not set (step S111: NO), the CPU 11 finishes the processing.

In this exemplary embodiment, the case of changing setting of "double side/single side" and "punch hole" is described. However, the present disclosure is not limited thereto. Any setting may be changed as long as the setting is for identical processing and a screen transition is made after a change of setting.

As described above, according to this exemplary embodiment, a change of setting is detected before operation is performed by controlling the flags. Accordingly, in the case of making a screen transition after setting is changed on a certain screen and returning to the screen on which the setting is changed, erroneous operation is reduced compared to a case where the user is not notified that the setting is changed.

Second Exemplary Embodiment

In the first exemplary embodiment, a form of performing notification in the case of transitioning to a screen for changing setting of a different type of identical processing after setting is changed is described. In this exemplary embodiment, a form of transitioning to a screen of different processing after setting is changed will be described. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

Figure 5:
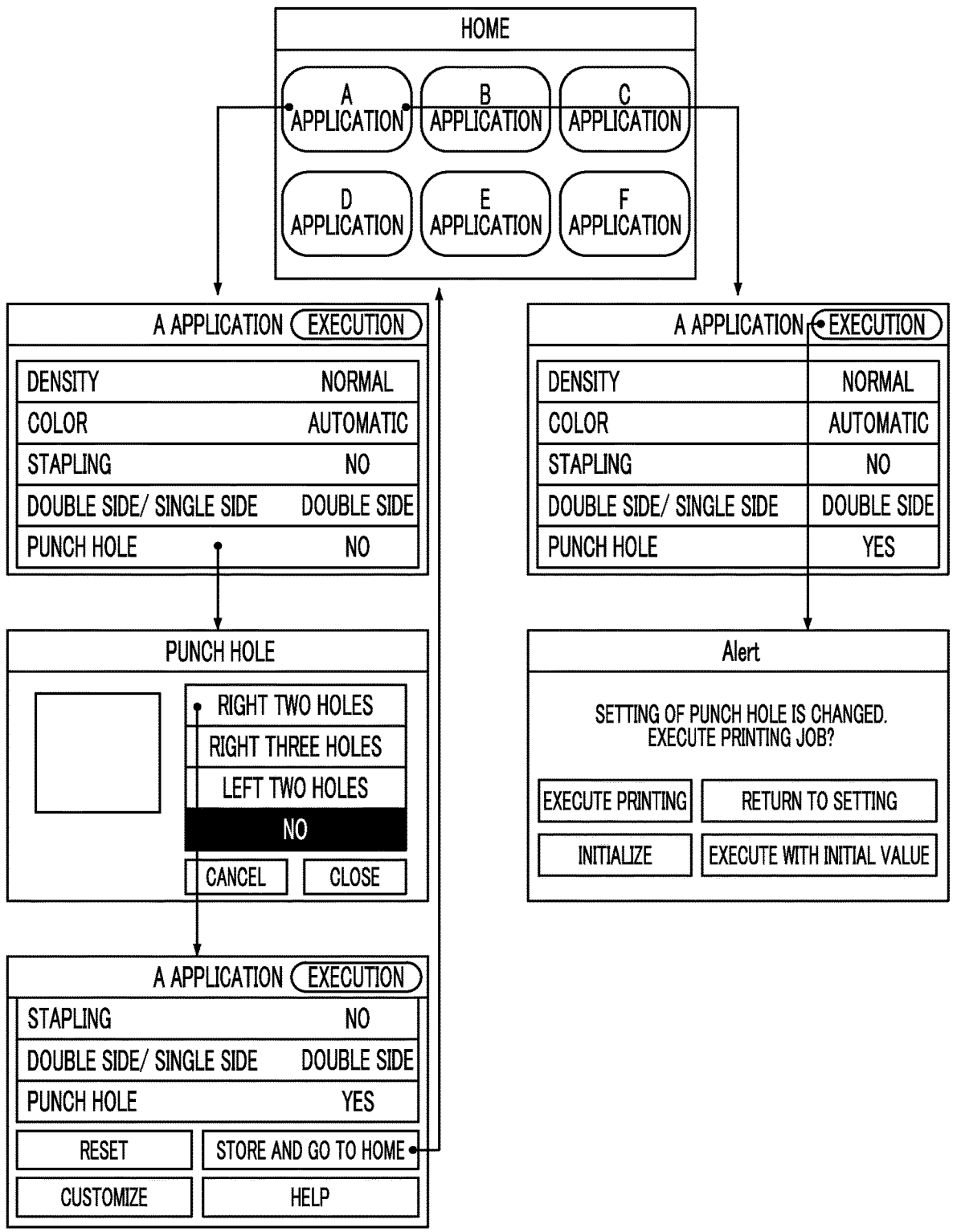
FIG. 5 is a schematic diagram illustrating one example of a screen provided in description of screen operation according to a second exemplary embodiment.

A specific example of screen operation will be described with reference to FIG. 5. FIG. 5 is a schematic diagram illustrating one example of a screen provided in description of screen operation according to this exemplary embodiment.

In a case where an A application is selected, the information processing apparatus 1 starts the A application and displays an A application home screen. For example, in a case where "punch hole" is selected, the information processing apparatus 1 transitions to the setting screen of "punch hole". In a case where "right two holes" is selected and setting of "punch hole" is changed on the setting screen of "punch hole", the information processing apparatus 1 causes the screen to transition to the A application home screen. The information processing apparatus 1 sets the setting change flag.

After the transition to the A application home screen, in a case where "store and go to home" is selected, the information processing apparatus 1 stores the changed setting and displays the home screen. The information processing apparatus 1 determines whether or not the setting change flag is set and sets the alert flag in a case where the setting change flag is set.

In a case where the A application is selected again on the home screen, the information processing apparatus 1 starts the A application and displays the A application home screen. In a case where "execution" is pushed, the information processing apparatus 1 determines whether or not the alert flag is set and performs notification that setting of the A application is changed in a case where the alert flag is set.

Figure 6:
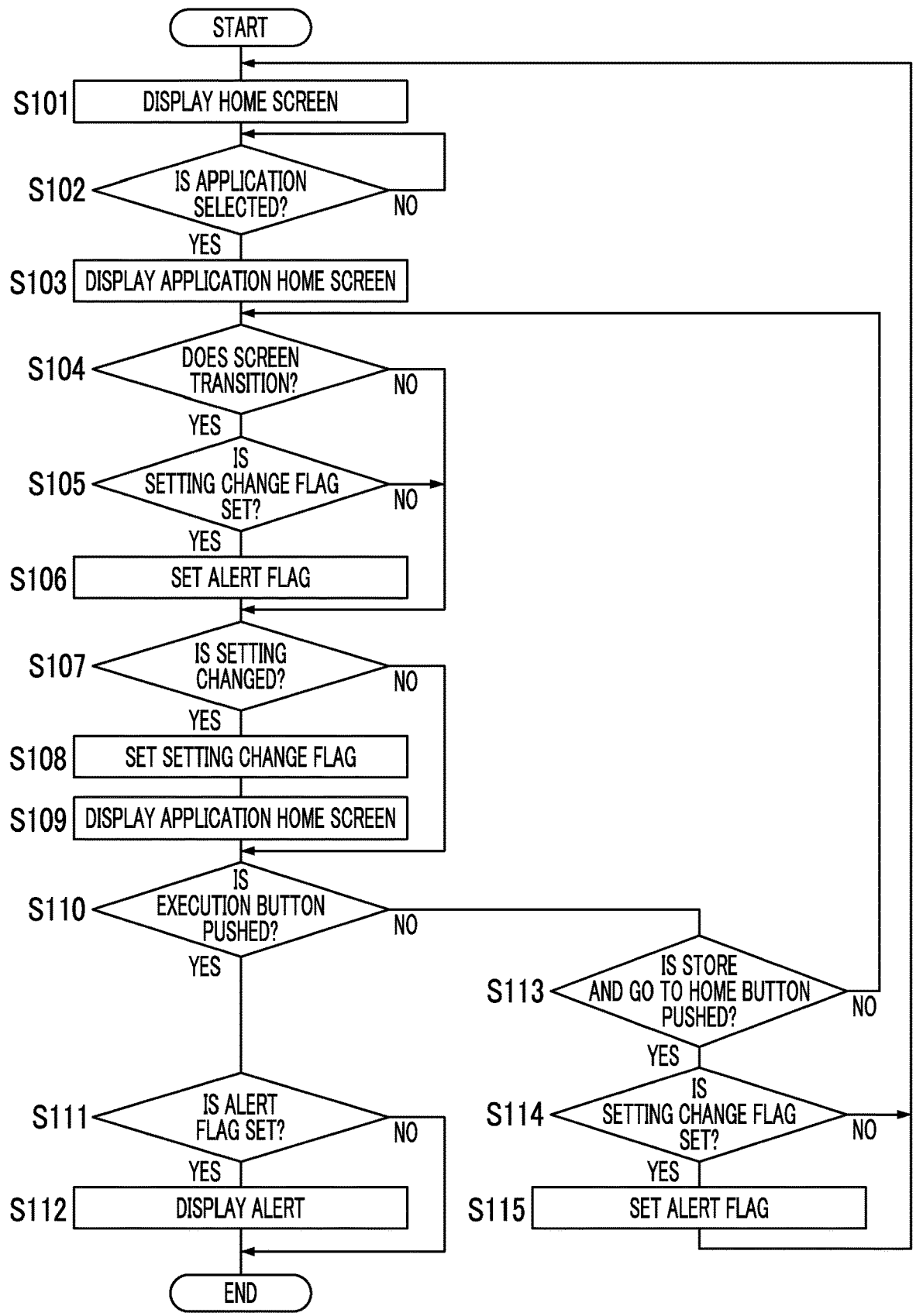
FIG. 6 is a flowchart illustrating one example of information processing according to the second exemplary embodiment.

Next, an effect of an information processing program according to this exemplary embodiment will be described with reference to FIG. 6. First, FIG. 6 is a flowchart illustrating one example of information processing according to this exemplary embodiment. The information processing illustrated in FIG. 6 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 6 is executed. In FIG. 6, steps identical to the information processing illustrated in FIG. 4 will be designated by reference signs identical to FIG. 4, and descriptions of the steps will not be repeated.

In step S110, the CPU 11 determines whether or not an execution button is pushed. In a case where the execution button is pushed (step S110: YES), the CPU 11 transitions to step S111. In a case where the execution button is not pushed (step S110: NO), the CPU 11 transitions to step S113.

In step S113, the CPU 11 determines whether or not a "store and go to home" button is pushed. In a case where the "store and go to home" button is pushed (step S113: YES), the CPU 11 transitions to step S114. In a case where the "store and go to home" button is not pushed (step S113: NO), the CPU 11 transitions to step S104.

In step S114, the CPU 11 determines whether or not the setting change flag is set. In a case where the setting change flag is set (step S114: YES), the CPU 11 transitions to step S115. In a case where the setting change flag is not set (step S114: NO), the CPU 11 transitions to step S101.

In step S115, the CPU 11 sets the alert flag.

As described above, according to this exemplary embodiment, even in the case of transitioning to the home screen after setting is changed and transitioning to the screen of identical processing again, the change of setting is detected before operation is performed. Accordingly, in the case of making a screen transition after setting is changed on a certain screen and returning to the screen on which the setting is changed, erroneous operation is reduced compared to a case where the user is not notified that the setting is changed.

Third Exemplary Embodiment

In the second exemplary embodiment, a form of performing notification in the case of transitioning to the home screen after setting is changed and transitioning to the screen of identical processing again is described. In this exemplary embodiment, a form of transitioning to a screen of different processing after setting is changed and transitioning again to the screen on which the setting is changed will be described. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

Figure 7:
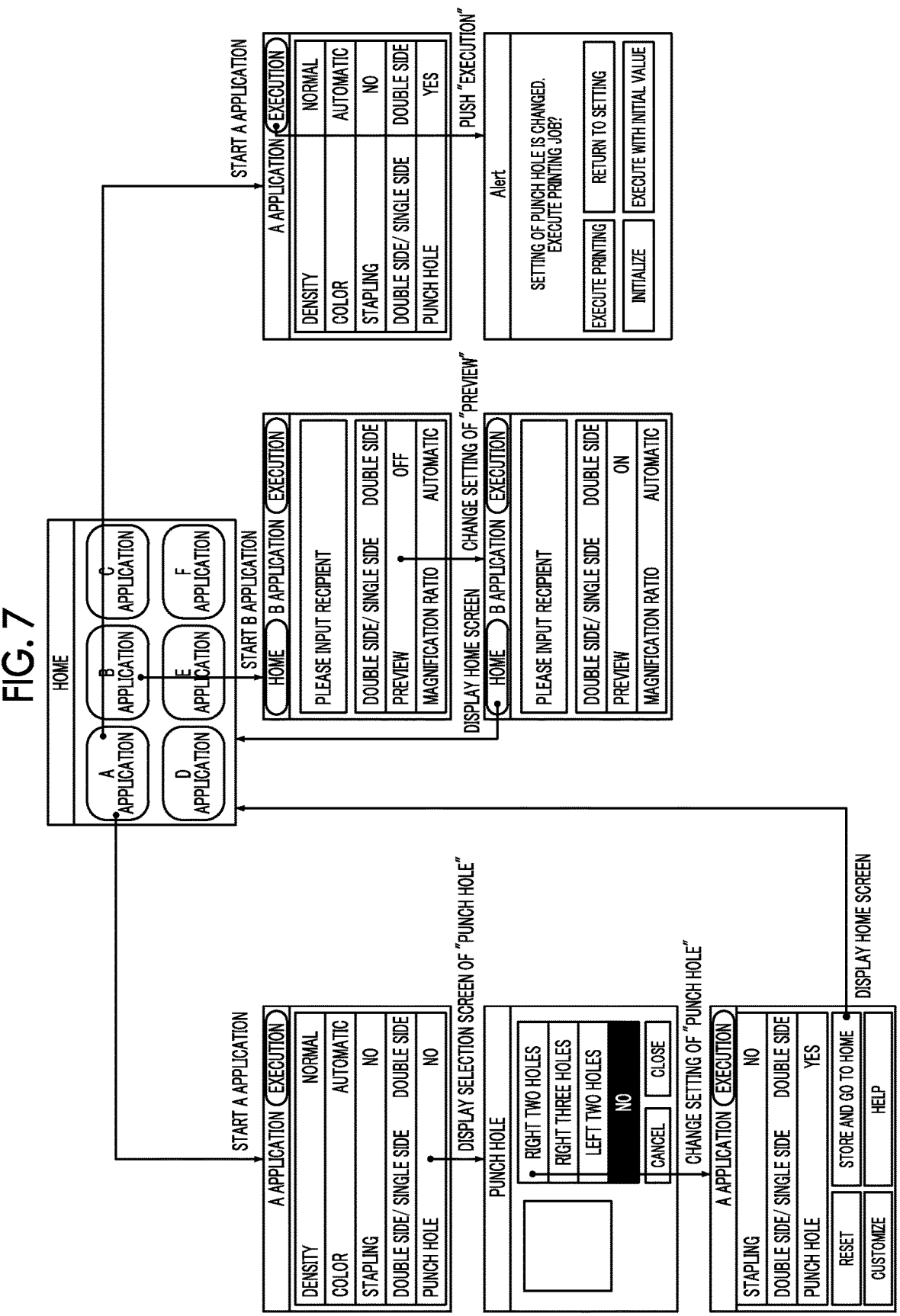
FIG. 7 is a schematic diagram illustrating one example of a screen provided in description of screen operation according to a third exemplary embodiment.

A specific example of screen operation will be described with reference to FIG. 7. FIG. 7 is a schematic diagram illustrating one example of a screen provided in description of screen operation according to this exemplary embodiment.

In a case where an A application is selected, the information processing apparatus 1 starts the A application and displays an A application home screen. For example, in a case where "punch hole" is selected, the information processing apparatus 1 transitions to the setting screen of "punch hole". In a case where "right two holes" is selected and setting of "punch hole" is changed on the setting screen of "punch hole", the information processing apparatus 1 causes the screen to transition to the A application home screen. The information processing apparatus 1 sets the setting change flag of the A application.

In a case where "store and go to home" is selected, the information processing apparatus 1 stores the changed setting and displays the home screen.

In a case where a B application is selected, the information processing apparatus 1 starts the B application and displays a B application home screen. The information processing apparatus 1 determines whether or not the setting change flag is set and whether or not setting of an application different from the application in which the screen transition is made is to be changed. In a case where the setting change flag is set and setting of an application different from the application in which the screen transition is made is to be changed, the information processing apparatus 1 sets the alert flag of the A application.

In a case where "preview" is selected, setting of "preview" is changed, and "home" is pushed on the B application home screen, the information processing apparatus 1 displays the home screen.

In a case where the A application is selected, the information processing apparatus 1 starts the A application and displays the A application home screen. In a case where "execution" is pushed, the information processing apparatus 1 determines whether or not the alert flag is set and performs notification that setting of the A application is changed in a case where the alert flag is set.

In a case where the setting change flag and the alert flag of the B application are set, notification that setting of the B application is changed is not performed even in a case where the execution button is pushed in the A application. For example, notification that setting of the B application is changed is performed in a case where the execution button of the B application is pushed.

Figure 8:
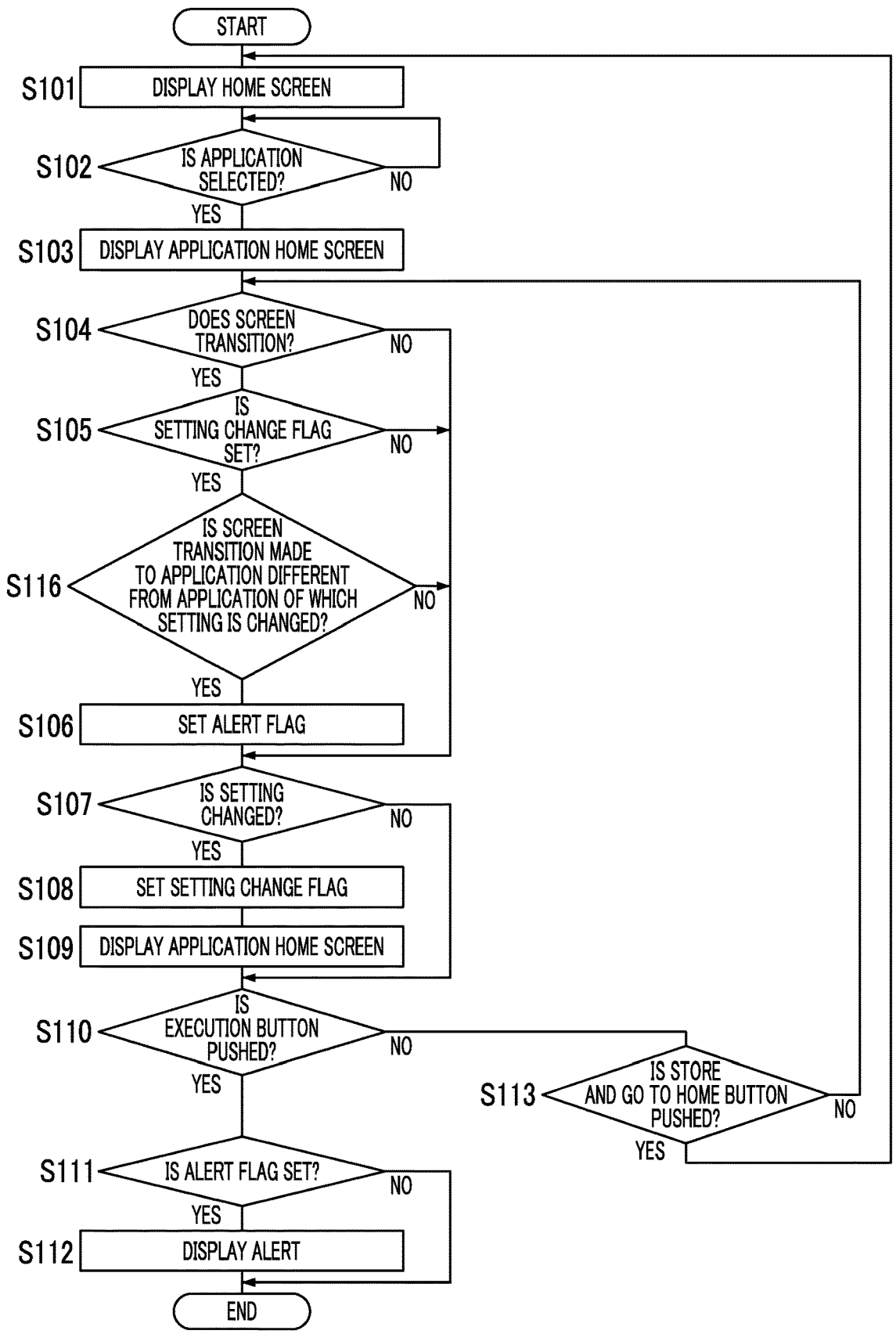
FIG. 8 is a flowchart illustrating one example of information processing according to the third exemplary embodiment.

Next, an effect of an information processing program according to this exemplary embodiment will be described with reference to FIG. 8. First, FIG. 8 is a flowchart illustrating one example of information processing according to this exemplary embodiment. The information processing illustrated in FIG. 8 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 8 is executed. In FIG. 8, steps identical to the information processing illustrated in FIG. 4 and FIG. 6 will be designated by reference signs identical to FIG. 4 and FIG. 6, and descriptions of the steps will not be repeated.

In step S105, the CPU 11 determines whether or not the setting change flag is set. In a case where the setting change flag is set (step S105: YES), the CPU 11 transitions to step S116. In a case where the setting change flag is not set (step S105: NO), the CPU 11 transitions to step S107.

In step S113, the CPU 11 determines whether or not the "store and go to home" button is pushed. In a case where the "store and go to home" button is pushed (step S113: YES), the CPU 11 transitions to step S101. In a case where the "store and go to home" button is not pushed (step S113: NO), the CPU 11 transitions to step S104.

In step S116, the CPU 11 determines whether or not a screen transition is made to an application different from the application of which setting is changed. In a case where a screen transition is made to an application different from the application of which setting is changed (step S116: YES), the CPU 11 transitions to step S106. In a case where a screen transition is not made to an application different from the application of which setting is changed (step S116: NO), the CPU 11 transitions to step S104.

As described above, according to this exemplary embodiment, even in the case of transitioning to a screen of different processing from processing of which setting is changed, the change of setting is detected before operation is performed. Accordingly, in the case of making a screen transition after setting is changed on a certain screen and returning to the screen on which the setting is changed, erroneous operation is reduced compared to a case where the user is not notified that the setting is changed.

Fourth Exemplary Embodiment

In the first exemplary embodiment, a form of performing notification in the case of transitioning to a screen for changing setting of a different type of identical processing after setting is changed is described. In this exemplary embodiment, a form of changing a display form and making a screen transition after setting is changed will be described. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

Figure 9:
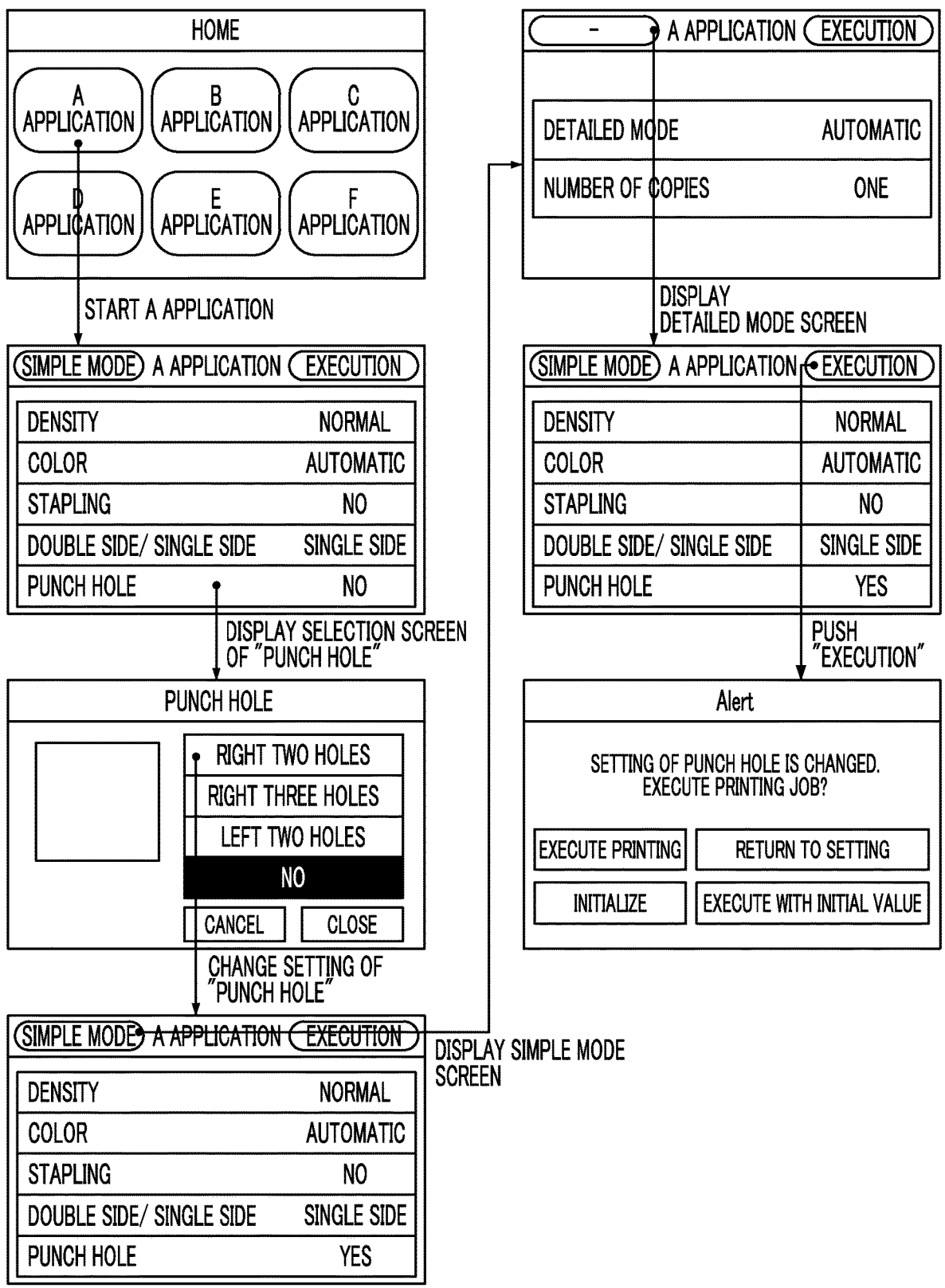
FIG. 9 is a schematic diagram illustrating one example of a screen provided in description of screen operation according to a fourth exemplary embodiment.

A specific example of screen operation will be described with reference to FIG. 9. FIG. 9 is a schematic diagram illustrating one example of a screen provided in description of screen operation according to this exemplary embodiment.

In a case where the A application is selected, the information processing apparatus 1 starts the A application and displays the A application home screen. For example, in a case where "punch hole" is selected, the information processing apparatus 1 transitions to the setting screen of "punch hole". In a case where "right two holes" is selected and setting of "punch hole" is changed on the setting screen of "punch hole", the information processing apparatus 1 transitions to the A application home screen. The information processing apparatus 1 sets the setting change flag.

In a case where a "simple mode" is selected, the information processing apparatus 1 displays a simple mode screen of the A application. The information processing apparatus 1 determines whether or not the setting change flag is set and sets the alert flag in a case where the setting change flag is set.

In a case where a "detailed mode" is selected, the information processing apparatus 1 displays a detailed mode screen of the A application. In a case where "execution" is pushed, the information processing apparatus 1 determines whether or not the alert flag is set and performs notification that setting of the A application is changed in a case where the alert flag is set.

Figure 10:
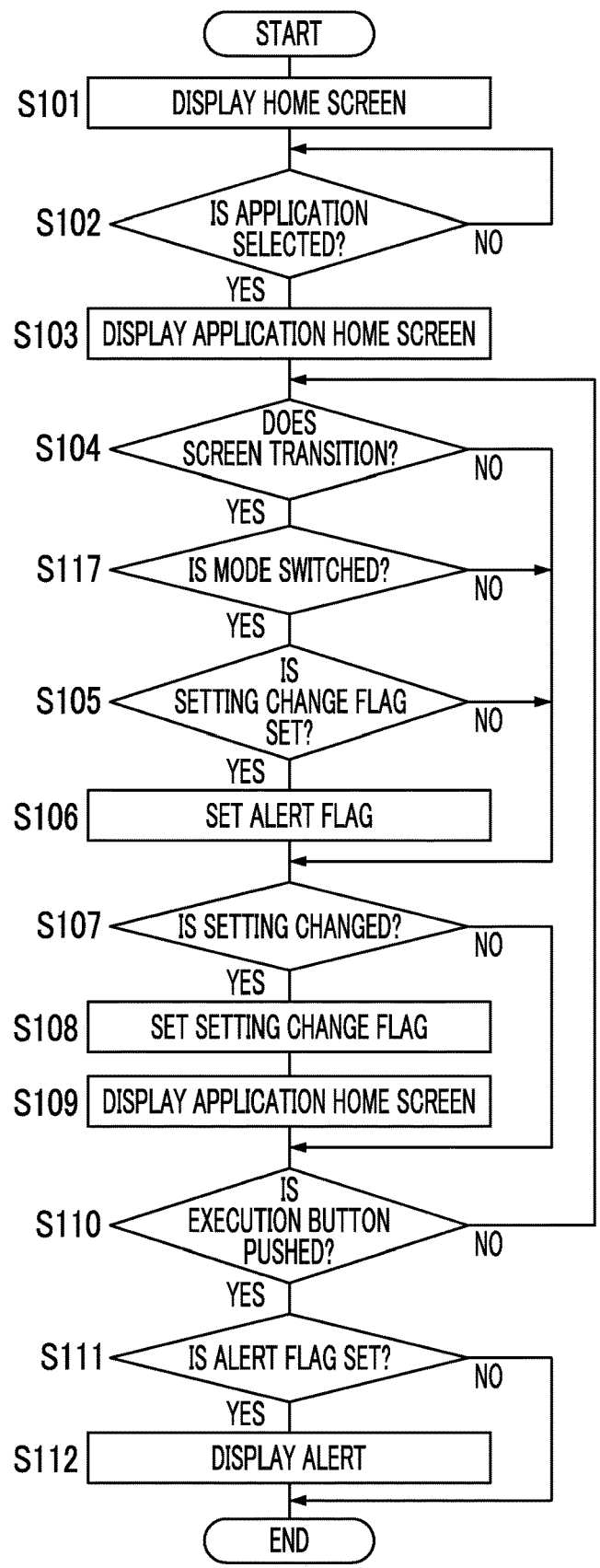
FIG. 10 is a flowchart illustrating one example of information processing according to the fourth exemplary embodiment.

Next, an effect of an information processing program according to this exemplary embodiment will be described with reference to FIG. 10. First, FIG. 10 is a flowchart illustrating one example of information processing according to this exemplary embodiment. The information processing illustrated in FIG. 10 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 10 is executed. In FIG. 10, steps identical to the information processing illustrated in FIG. 4, FIG. 6, and FIG. 8 will be designated by reference signs identical to FIG. 4, FIG. 6, and FIG. 8, and descriptions of the steps will not be repeated.

In step S104, the CPU 11 determines whether or not a button is pushed and a screen transition is made. In the case of making a screen transition (step S104: YES), the CPU 11 transitions to step S117. In the case of not making a screen transition (step S104: NO), the CPU 11 transitions to step S107.

In step S117, the CPU 11 determines whether or not a "mode switching" button is pushed and switching is performed between display of the detailed mode and display of the simple mode. In a case where the "mode switching" button is pushed and switching is performed between the display of the detailed mode and the display of the simple mode (step S117: YES), the CPU transitions to step S105. In a case where the "mode switching" button is not pushed and switching is not performed between the display of the detailed mode and the display of the simple mode (step S117: NO), the CPU 11 transitions to step S107.

As described above, according to this exemplary embodiment, even in the case of changing the display form and making a screen transition, the change of setting is detected before operation is performed. Accordingly, in the case of making a screen transition after setting is changed on a certain screen and returning to the screen on which the setting is changed, erroneous operation is reduced compared to a case where the user is not notified that the setting is changed.

Fifth Exemplary Embodiment

In the first exemplary embodiment, a form of performing notification in the case of transitioning to a screen for changing setting of a different type of identical processing after setting is changed is described. In this exemplary embodiment, a form of performing notification in a case where operation is performed by a different user after setting is changed will be described. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

Figure 11:
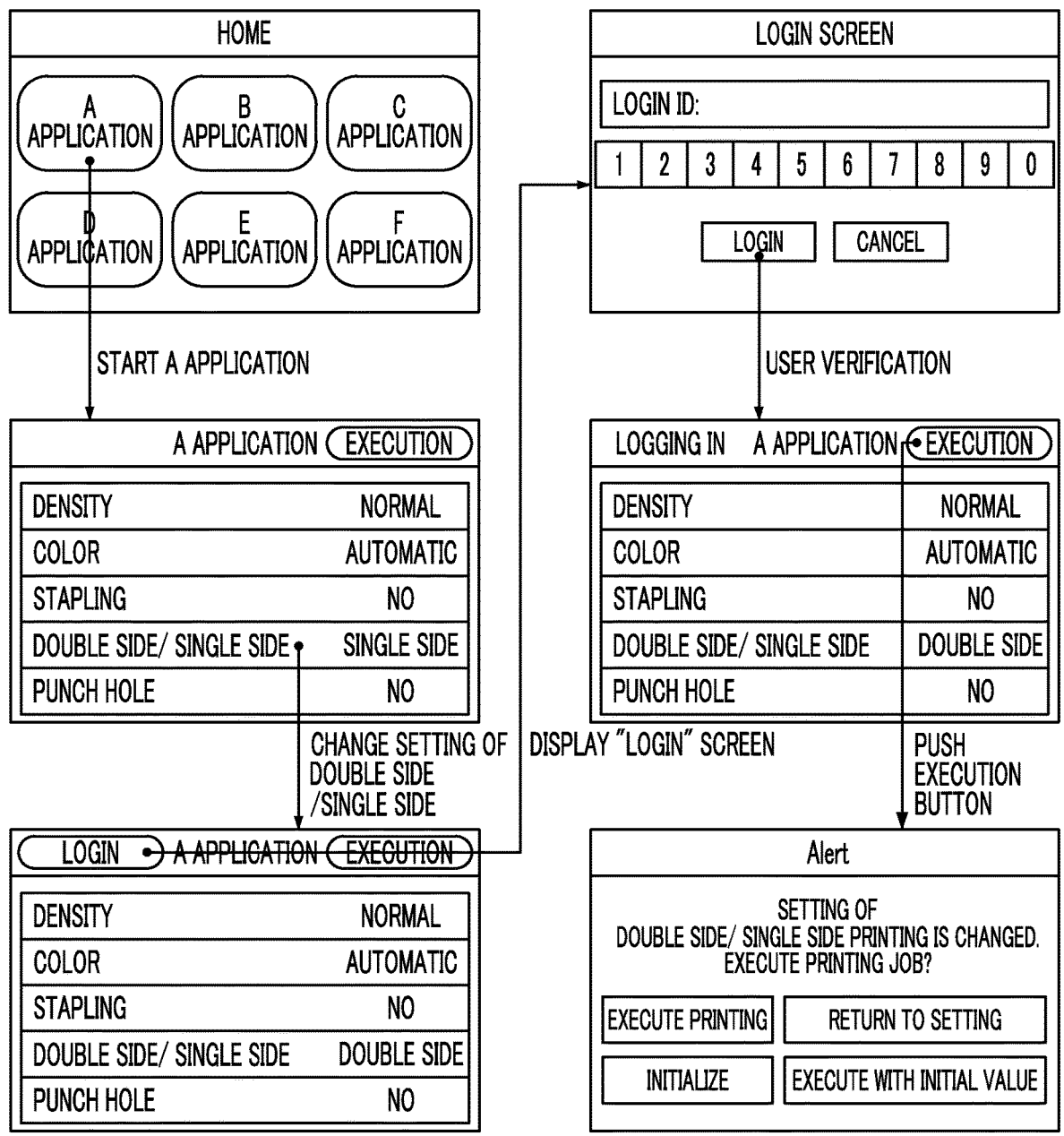
FIG. 11 is a schematic diagram illustrating one example of a screen provided in description of screen operation according to a fifth exemplary embodiment.

A specific example of screen operation will be described with reference to FIG. 11. FIG. 11 is a schematic diagram illustrating one example of a screen provided in description of screen operation according to this exemplary embodiment.

In a case where an A application is selected, the information processing apparatus 1 starts the A application and displays an A application home screen. For example, in a case where "double side/single side" is selected, the information processing apparatus 1 changes setting of "double side/single side". The information processing apparatus 1 sets the setting change flag.

In a case where "login" is selected, the information processing apparatus 1 displays a login screen of the A application. In a case where a login ID is input and a "login" button is pushed, the information processing apparatus 1 verifies the user. The information processing apparatus 1 determines whether or not the setting change flag is set and sets the alert flag in a case where the setting change flag is set.

After the user is verified, the information processing apparatus 1 displays the A application home screen. In a case where "execution" is pushed, the information processing apparatus 1 determines whether or not the alert flag is set and performs notification that setting of the A application is changed in a case where the alert flag is set.

Figure 12:
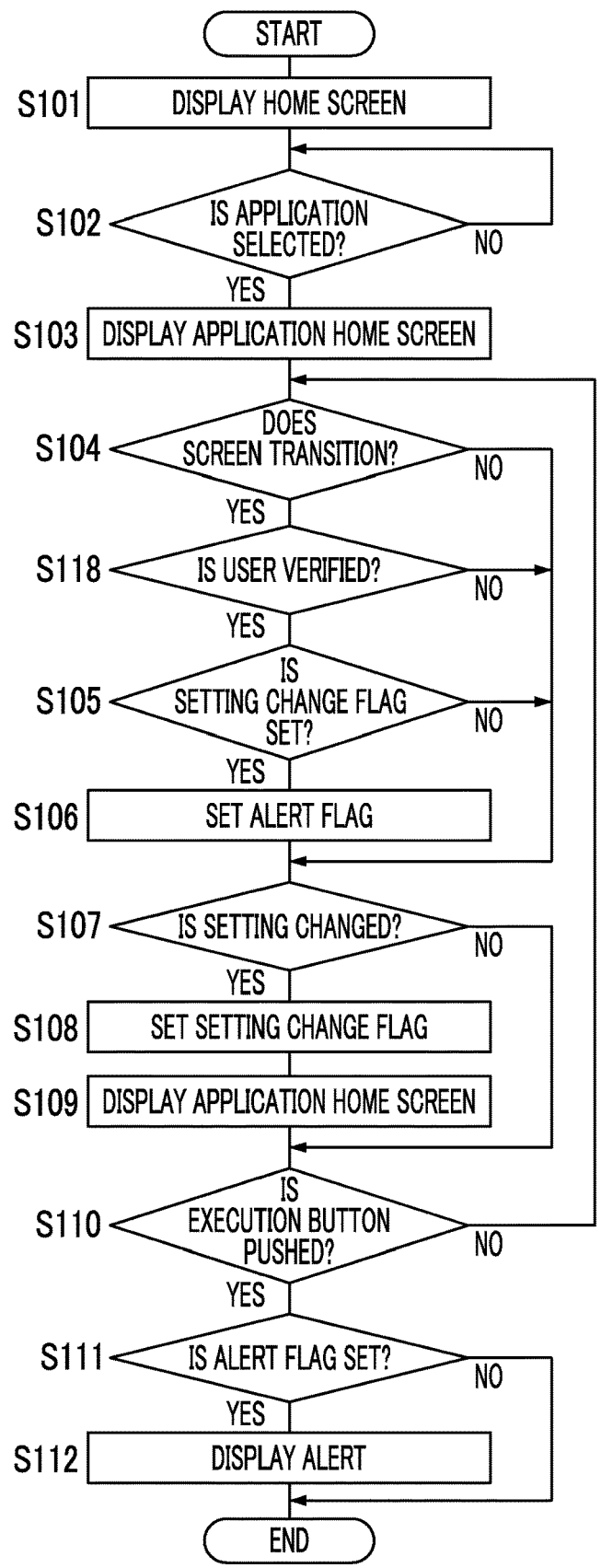
FIG. 12 is a flowchart illustrating one example of information processing according to the fifth exemplary embodiment.

Next, an effect of an information processing program according to this exemplary embodiment will be described with reference to FIG. 12. First, FIG. 12 is a flowchart illustrating one example of information processing according to this exemplary embodiment. The information processing illustrated in FIG. 12 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 12 is executed. In FIG. 12, steps identical to the information processing illustrated in FIG. 4, FIG. 6, FIG. 8, and FIG. 10 will be designated by reference signs identical to FIG. 4, FIG. 6, FIG. 8, and FIG. 10, and descriptions of the steps will not be repeated.

In step S104, the CPU 11 determines whether or nota button is pushed and a screen transition is made. In the case of making a screen transition (step S104: YES), the CPU 11 transitions to step S118. In the case of not making a screen transition (step S104: NO), the CPU 11 transitions to step S107.

In step S118, the CPU 11 determines whether or not the user is verified. In a case where the user is verified (step S118: YES), the CPU 11 transitions to step S105. In a case where the user is not verified (step S104: NO), the CPU 11 transitions to step S107.

A form in which detection of operation performed by a different user according to this exemplary embodiment is a form of performing verification of the user after setting is changed is described. However, the present disclosure is not limited thereto. For example, the information processing apparatus 1 may be equipped with a human presence sensor. In a case where approach of a user after a user once moves away from the information processing apparatus 1 is detected by the human presence sensor, the information processing apparatus 1 may perform notification by determining that operation is performed by a different user. Alternatively, in a case where the "execution" button is pushed after an elapse of a predetermined time from the change of setting, notification may be performed by determining that operation is performed by a different user. Alternatively, in a case where operation performed by the identical user is detected, notification of alert may not be performed. For example, in a case where the "execution" button is pushed within a predetermined time from the change of setting, notification may not be performed by determining that operation is performed by the same user.

A method of verification according to this exemplary embodiment is described in the form of inputting the login ID on the login screen and performing verification. However, the present disclosure is not limited thereto. For example, the information processing apparatus 1 may be equipped with a near field communication (NFC) reader and perform verification of the user by acquiring information from an integrated circuit (IC) card possessed by the user through the NFC reader. For example, after setting is changed, the information processing apparatus 1 may perform verification of the user by acquiring information on the user from the IC card through the NFC reader and perform notification in a case where a transition is made to any screen.

As described above, according to this exemplary embodiment, a change of setting performed by a different user is detected. Accordingly, erroneous operation is further reduced compared to a case where the user is not notified that setting is changed even in a case where operation performed by a different user is detected.

Sixth Exemplary Embodiment

In the first exemplary embodiment, a form of performing notification in the case of transitioning to a screen for changing setting of a different type of identical processing after setting is changed is described. However, the present disclosure is not limited thereto. In this exemplary embodiment, a form of not performing notification in a case where a change of setting is confirmed even in a case where a screen transition is made after setting is changed will be described.

Figure 13:
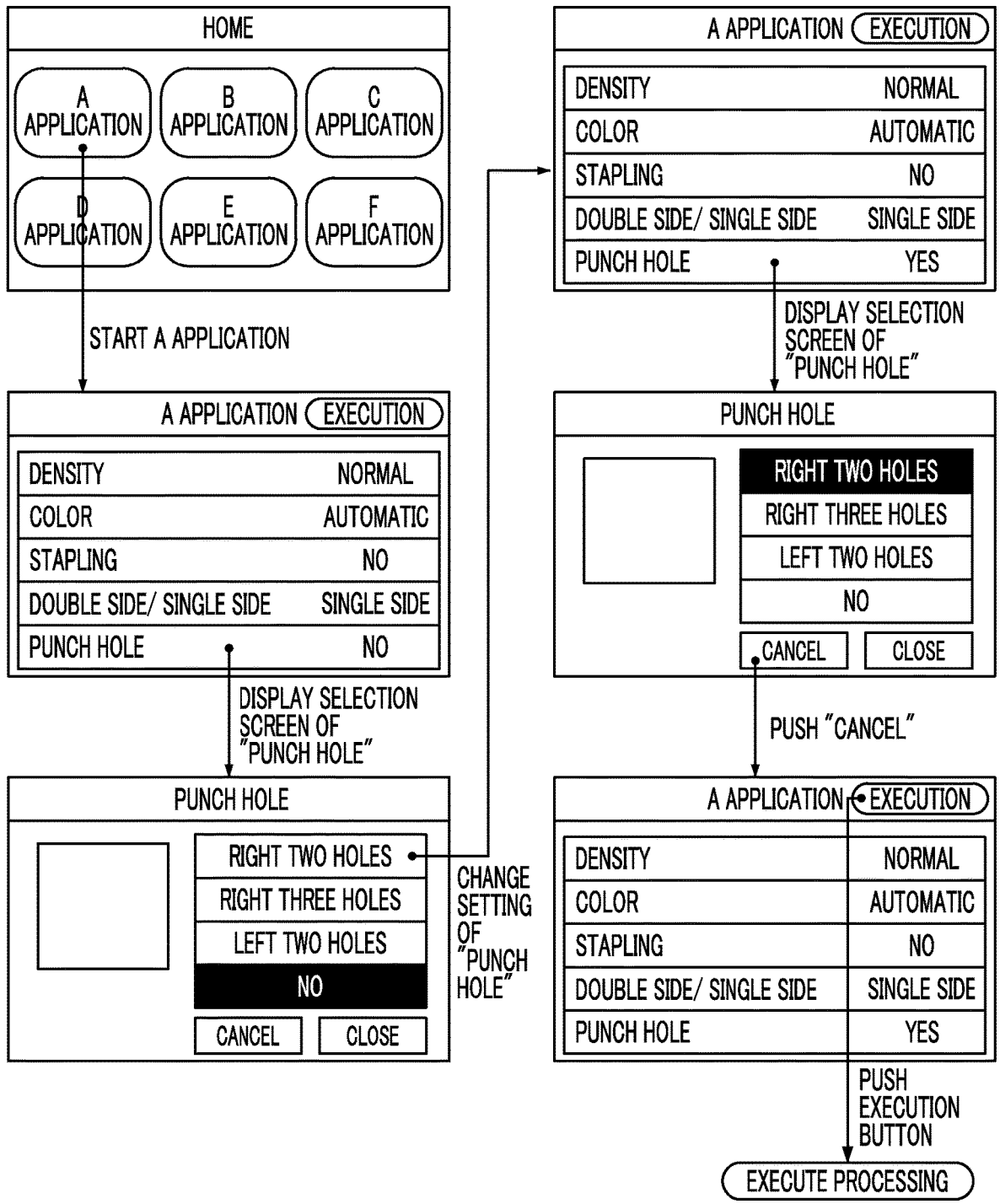
FIG. 13 is a schematic diagram illustrating one example of a screen provided in description of screen operation according to a sixth exemplary embodiment.

Specifically, a specific example of screen operation will be described with reference to FIG. 13. FIG. 13 is a schematic diagram illustrating one example of a screen provided in description of screen operation according to this exemplary embodiment. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

In a case where the A application is selected, the information processing apparatus 1 starts the A application and displays the A application home screen. For example, in a case where "punch hole" is selected, the information processing apparatus 1 transitions to the setting screen of "punch hole". In a case where "right two holes" is selected and setting of "punch hole" is changed on the setting screen of "punch hole", the information processing apparatus 1 transitions to the A application home screen. The information processing apparatus 1 sets the setting change flag.

In a case where "punch hole" is selected again on the A application home screen, the information processing apparatus 1 transitions to the setting screen of "punch hole". In a case where "cancel" is pushed on the setting screen of "punch hole", the information processing apparatus 1 transitions to the A application home screen. The information processing apparatus 1 determines that the change of setting of "punch hole" is confirmed and unsets the setting change flag.

In a case where "execution" is pushed, the information processing apparatus 1 determines whether or not the alert flag is set and performs notification that setting of the A application is changed in a case where the alert flag is set.

In a case where the alert flag is not set, notification that setting of the A application is changed is not performed.

Notification according to this exemplary embodiment is described in the form of not performing notification in a case where a change of setting is confirmed. However, the present disclosure is not limited thereto. For example, in a case where changed setting is predetermined setting, notification may be performed even in a case where the change of setting is confirmed. Specifically, in a case where prioritized setting such as a recipient is changed, the setting change flag is not unset even in a case where the change of setting is confirmed.

Figure 14:
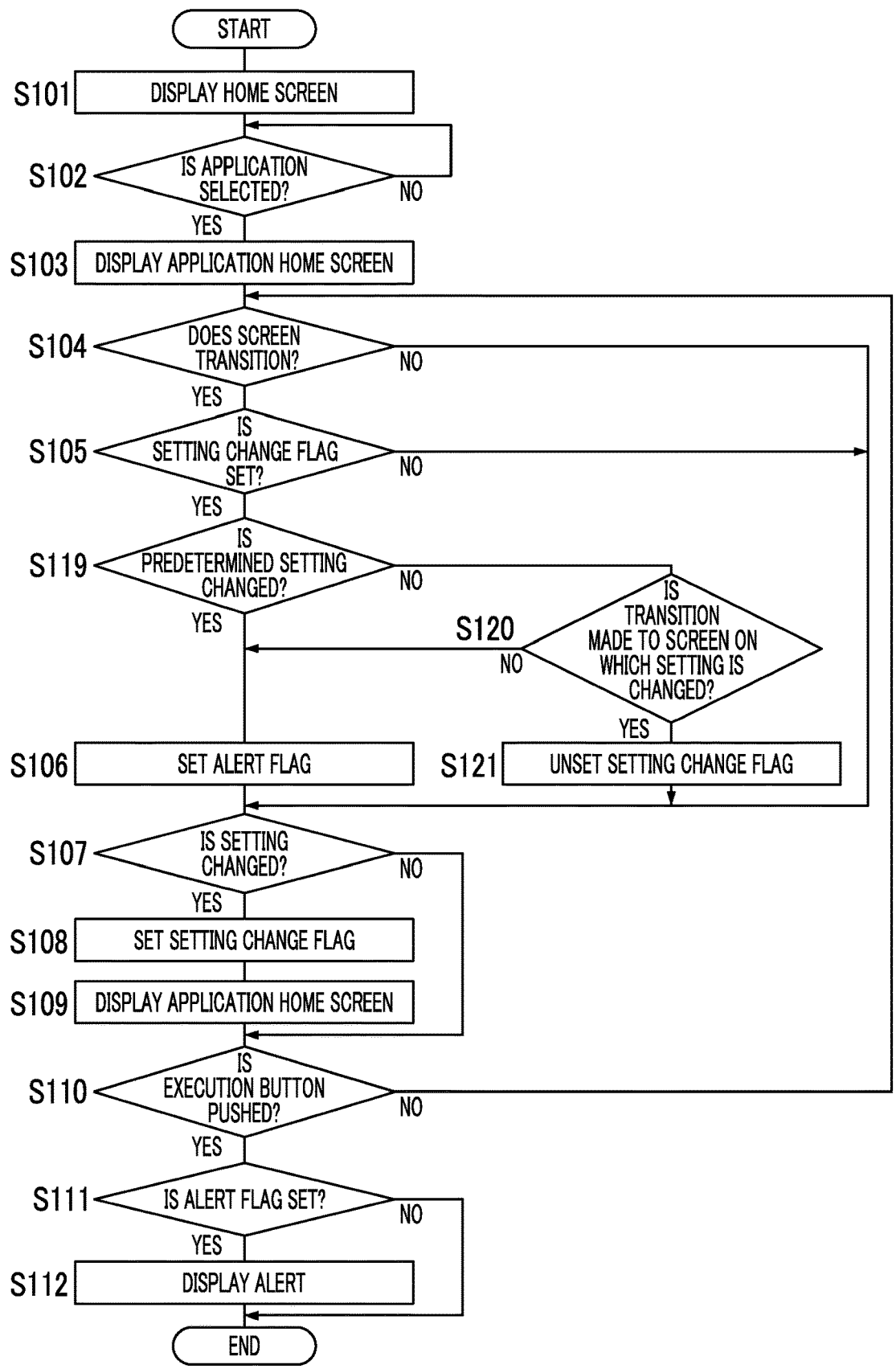
FIG. 14 is a flowchart illustrating one example of information processing according to the sixth exemplary embodiment.

Next, an effect of an information processing program according to this exemplary embodiment will be described with reference to FIG. 14. First, FIG. 14 is a flowchart illustrating one example of information processing according to this exemplary embodiment. The information processing illustrated in FIG. 14 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 14 is executed. In FIG. 14, steps identical to the information processing illustrated in FIG. 4, FIG. 6, FIG. 8, FIG. 10, and FIG. 12 will be designated by reference signs identical to FIG. 4, FIG. 6, FIG. 8, FIG. 10, and FIG. 12 and descriptions of the steps will not be repeated.

In step S105, the CPU 11 determines whether or not the setting change flag is set. In a case where the setting change flag is set (step S105: YES), the CPU 11 transitions to step S119. In a case where the setting change flag is not set (step S105: NO), the CPU 11 transitions to step S107.

In step S119, the CPU 11 determines whether or not the predetermined setting is changed. In a case where the predetermined setting is changed (step S119: YES), the CPU 11 transitions to step S106. In a case where the predetermined setting is not changed (step S119: NO), the CPU 11 transitions to step S120.

In step S120, the CPU 11 determines whether or not a transition is made to a screen on which setting is changed. In a case where a transition is made to a screen on which setting is changed (step S120: YES), the CPU 11 transitions to step S121. In a case where a transition is not made to a screen on which setting is changed (step S120: NO), the CPU 11 transitions to step S106.

In step S121, the CPU 11 unsets the setting change flag.

As described above, according to this exemplary embodiment, operability is improved compared to a case where notification is performed even in a case where a change of setting is confirmed by the user.

Seventh Exemplary Embodiment

In the first exemplary embodiment, a form of performing notification in the case of transitioning to a screen for changing setting of a different type of identical processing after setting is changed is described. However, the present disclosure is not limited thereto. In this exemplary embodiment, a form of performing notification in a case where identical setting is changed a plurality of times within a predetermined period will be described.

Figure 15:
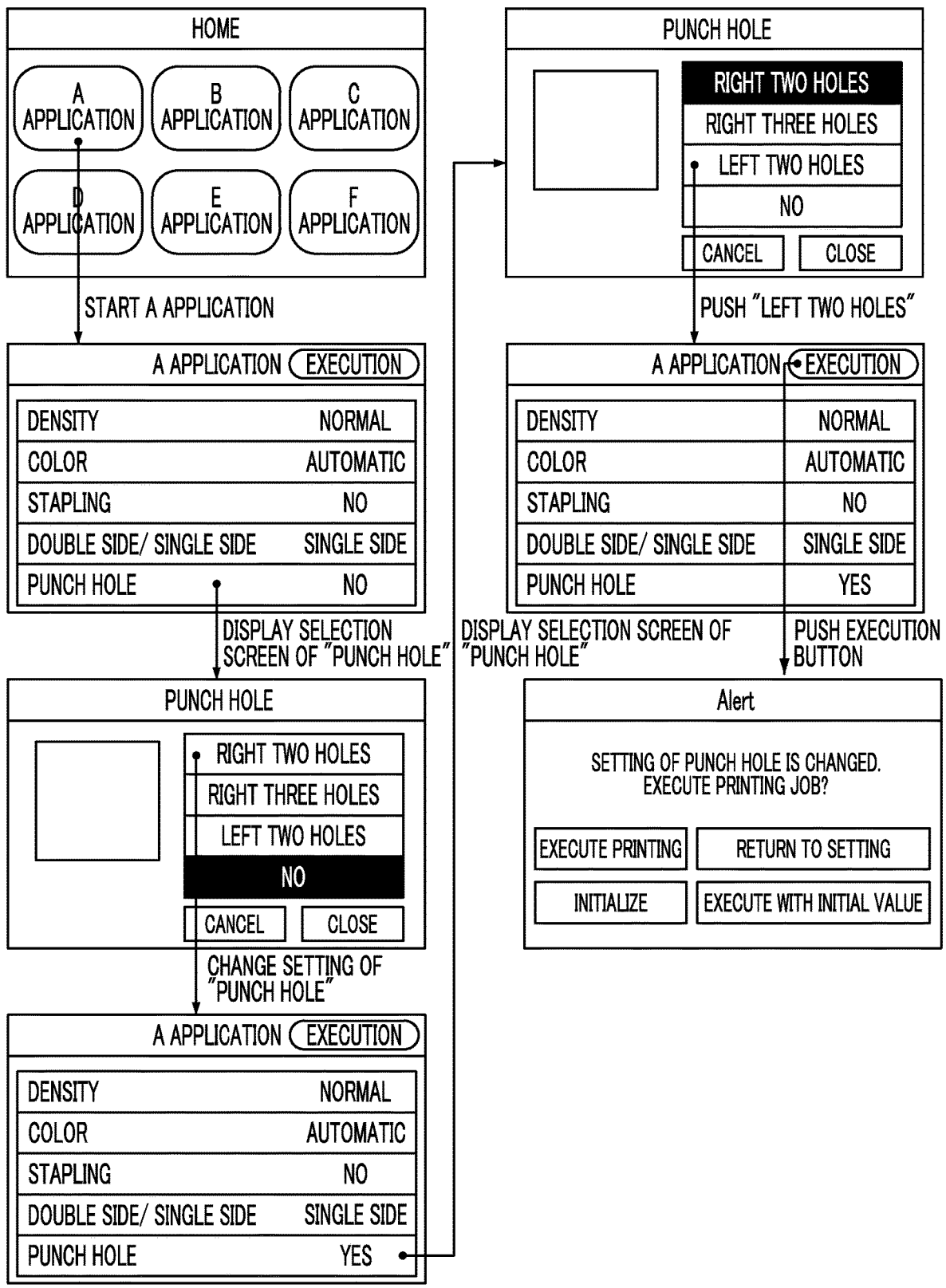
FIG. 15 is a schematic diagram illustrating one example of a screen provided in description of screen operation according to a seventh exemplary embodiment.

Specifically, a specific example of screen operation will be described with reference to FIG. 15. FIG. 15 is a schematic diagram illustrating one example of a screen provided in description of screen operation according to this exemplary embodiment. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

In a case where the A application is selected, the information processing apparatus 1 starts the A application and displays the A application home screen. For example, in a case where "punch hole" is selected, the information processing apparatus 1 transitions to the setting screen of "punch hole". In a case where "right two holes" is selected and setting of "punch hole" is changed on the setting screen of "punch hole", the information processing apparatus 1 transitions to the A application home screen. The information processing apparatus 1 sets the setting change flag.

In a case where "punch hole" is selected again on the A application home screen, the information processing apparatus 1 transitions to the setting screen of "punch hole". In a case where "left two holes" is pushed on the setting screen of "punch hole", the information processing apparatus 1 transitions to the A application home screen. The information processing apparatus 1 determines that setting of "punch hole" is changed again and sets an indication of the change performed again in the setting change flag. One example of a method of setting the indication of the change performed again is a method of setting a number. Specifically, the information processing apparatus 1 sets "1" in the setting change flag in the case of an initial change of setting and sets "2" in the setting change flag in a case where setting is changed again and "1" is set in the setting change flag.

In a case where "execution" is pushed, the information processing apparatus 1 determines whether or not setting is changed a plurality of times for identical setting and sets the alert flag in a case where setting is changed a plurality of times. The information processing apparatus 1 determines whether or not the alert flag is set and performs notification that setting of the A application is changed in a case where the alert flag is set.

Figure 16:
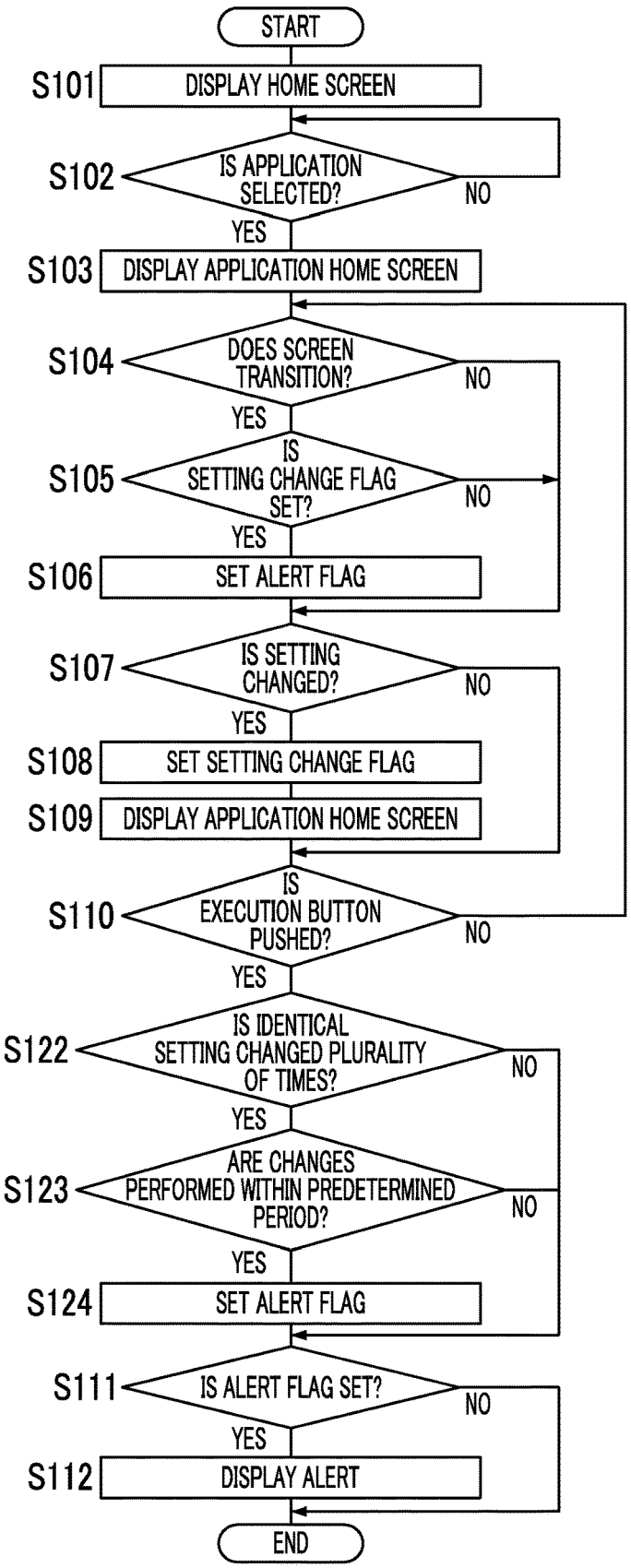
FIG. 16 is a flowchart illustrating one example of information processing according to the seventh exemplary embodiment.

Next, an effect of an information processing program according to this exemplary embodiment will be described with reference to FIG. 16. First, FIG. 16 is a flowchart illustrating one example of information processing according to this exemplary embodiment. The information processing illustrated in FIG. 16 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 16 is executed. In FIG. 16, steps identical to the information processing illustrated in FIG. 4, FIG. 6, FIG. 8, FIG. 10, FIG. 12, and FIG. 14 will be designated by reference signs identical to FIG. 4, FIG. 6, FIG. 8, FIG. 10, FIG. 12, and FIG. 14 and descriptions of the steps will not be repeated.

In step S110, the CPU 11 determines whether or not the execution button is pushed. In a case where the execution button is pushed (step S110: YES), the CPU 11 transitions to step S122. In a case where the execution button is not pushed (step S110: NO), the CPU 11 transitions to step S104.

In step S122, the CPU 11 determines whether or not identical setting is changed a plurality of times. In a case where identical setting is changed a plurality of times (step S122: YES), the CPU 11 transitions to step S123. In a case where identical setting is not changed a plurality of times (step S122: NO), the CPU 11 transitions to step S111.

In step S123, the CPU 11 determines whether or not the plurality of changes of setting are performed within the predetermined period. In a case where the changes are performed within the predetermined period (step S123: YES), the CPU 11 transitions to step S124. Ina case where the changes are not performed within the predetermined period (step S123: NO), the CPU 11 transitions to step S111.

In step S124, the CPU 11 sets the alert flag.

In this exemplary embodiment, a form of performing notification in a case where identical setting is changed a plurality of times within a predetermined period is described. However, the present disclosure is not limited thereto. For example, notification may be performed in a case where an identical button is pushed a plurality of times within a predetermined period, or notification may be performed in a case where operation is not performed within a predetermined period. Specifically, the information processing apparatus 1 performs notification in a case where the "execution" button is pushed a plurality of times in a short time.

As described above, according to this exemplary embodiment, erroneous operation in the case of performing operation in a hurry is reduced compared to a case where notification is not performed when identical setting is changed a plurality of times within a predetermined period.

Eighth Exemplary Embodiment

In the first exemplary embodiment, a form of performing notification in the case of transitioning to a screen for changing setting of a different type of identical processing after setting is changed is described. However, the present disclosure is not limited thereto. In this exemplary embodiment, a form of performing notification in a case where the execution instruction is provided a plurality of times will be described.

Figure 17:
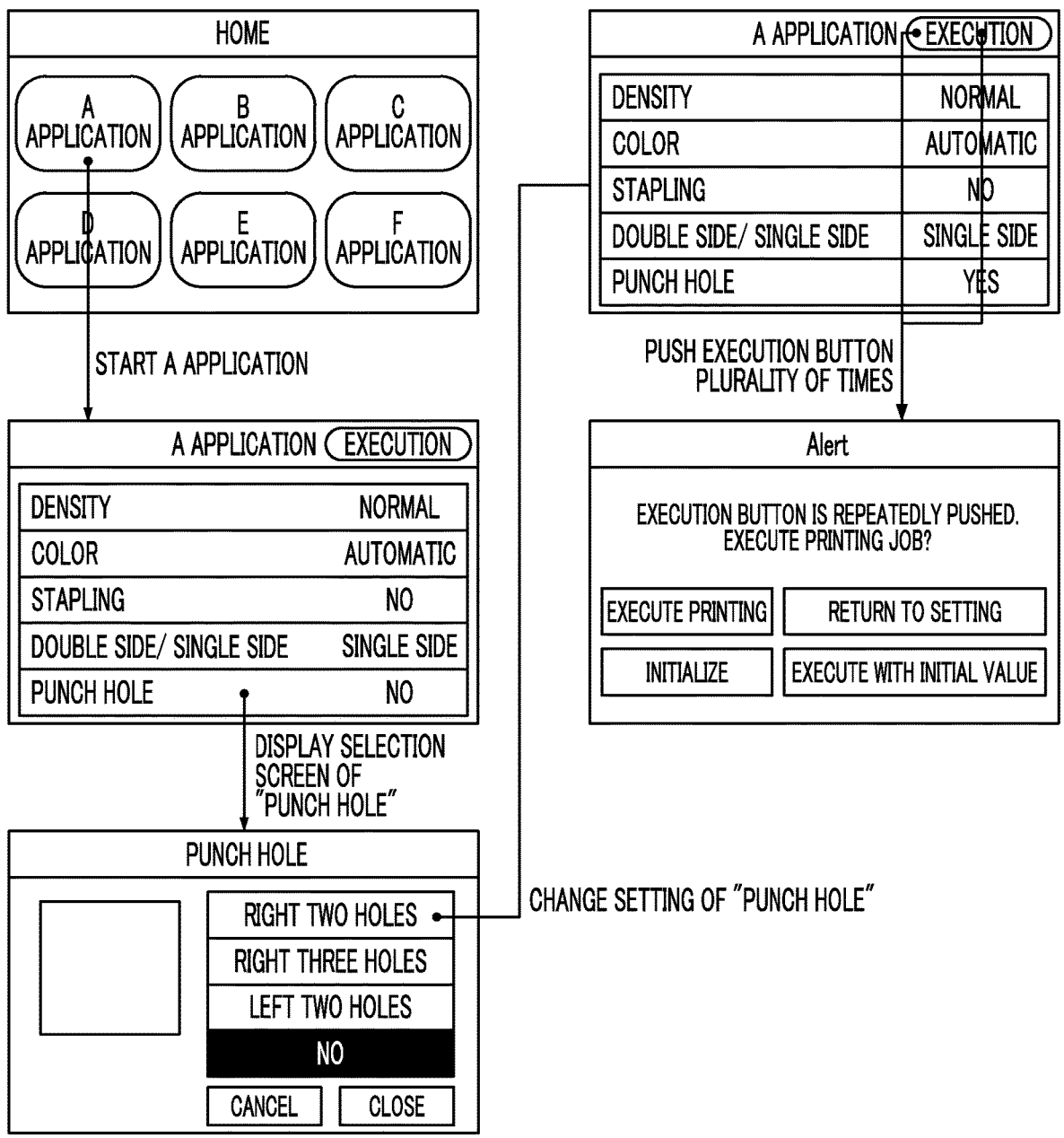
FIG. 17 is a schematic diagram illustrating one example of a screen provided in description of screen operation according to an eighth exemplary embodiment.

Specifically, a specific example of screen operation will be described with reference to FIG. 17. FIG. 17 is a schematic diagram illustrating one example of a screen provided in description of screen operation according to this exemplary embodiment. A block diagram (refer to FIG. 1) illustrating a hardware configuration of the information processing apparatus 1 according to this exemplary embodiment and a block diagram (refer to FIG. 2) illustrating a functional configuration of the information processing apparatus 1 are the same as the first exemplary embodiment. Thus, descriptions of the block diagrams will not be repeated.

In a case where the A application is selected, the information processing apparatus 1 starts the A application and displays the A application home screen. For example, in a case where "punch hole" is selected, the screen transitions by displaying the setting screen of "punch hole".

In a case where "right two holes" is selected and setting of "punch hole" is changed on the setting screen of "punch hole", the information processing apparatus 1 causes the screen to transition by displaying the A application home screen. The information processing apparatus 1 sets the setting change flag.

In a case where "execution" is pushed, the information processing apparatus 1 determines whether or not "execution" is pushed a plurality of times within a predetermined period and sets the alert flag in a case where "execution" is pushed a plurality of times within the predetermined period.

In addition, the information processing apparatus 1 determines whether or not the alert flag is set and performs notification that "execution" of the A application is pushed a plurality of times in a case where the alert flag is set.

Next, an effect of an information processing program according to this exemplary embodiment will be described with reference to FIG. 18. First, FIG. 18 is a flowchart illustrating one example of information processing according to this exemplary embodiment. The information processing illustrated in FIG. 18 is executed by causing the CPU 11 to read the information processing program from the ROM 12 or the storage 14 and executing the information processing program. For example, in a case where the information processing apparatus 1 is started and an execution instruction of the information processing program is input, the information processing illustrated in FIG. 18 is executed. In FIG. 18, steps identical to the information processing illustrated in FIG. 4, FIG. 6, FIG. 8, FIG. 10, FIG. 12, FIG. 14, and FIG. 16 will be designated by reference signs identical to FIG. 4, FIG. 6, FIG. 8, FIG. 10, FIG. 12, FIG. 14, and FIG. 16 and descriptions of the steps will not be repeated.

In step S110, the CPU 11 determines whether or not the execution button is pushed. In a case where the execution button is pushed (step S110: YES), the CPU 11 transitions to step S125. In a case where the execution button is not pushed (step S110: NO), the CPU 11 transitions to step S104.

In step S125, the CPU 11 determines whether or not the execution button is pushed a plurality of times. In a case where the execution button is pushed a plurality of times (step S125: YES), the CPU 11 transitions to step S126. In a case where the execution button is not pushed a plurality of times (step S125: NO), the CPU 11 transitions to step S111.

In step S126, the CPU 11 determines whether or not the execution button is pushed a plurality of times within the predetermined period. In a case where the execution button is pushed a plurality of times within the predetermined period (step S126: YES), the CPU 11 transitions to step S127. In a case where the execution button is not pushed a plurality of times within the predetermined period (step S126: NO), the CPU 11 transitions to step S111.

In step S127, the CPU 11 sets the alert flag.

As described above, according to this exemplary embodiment, erroneous operation in the case of performing operation in a hurry is reduced compared to a case where notification is not performed in a case where identical setting is changed a plurality of times or the execution instruction of processing is provided a plurality of times within a predetermined period.

In the exemplary embodiment according to the present invention, a form of setting the setting change flag and the alert flag for each application is described. However, the present disclosure is not limited thereto. The setting change flag and the alert flag may be set for each application and each setting.

Besides, the configuration of the information processing apparatus 1 described in the exemplary embodiments is one example and may be changed in accordance with a situation without departing from a gist.

The flow of processing of the program described in the exemplary embodiments is one example. Unnecessary steps may be removed, new steps may be added, or the order of processing may be changed without departing from the gist.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

While an aspect in which the information processing program is prestored (installed) in the storage 14 is described in each of the exemplary embodiments, this disclosure is not limited thereto. The program may be provided in the form of a recording on a recording medium such as a compact disc read only memory (CD-ROM), a digital versatile disc read only memory (DVD-ROM), and a universal serial bus (USB) memory. Alternatively, the program may be in the form of being downloaded from an external apparatus through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      perform a control for displaying on a screen:
         a first screen for:
            receiving a first change to a first setting of a first processing; and
            receiving an instruction to execute the first processing;
         a second screen for at least one of:
            receiving a second change to a second setting related to the first processing; or
            controlling a second processing that is different from the first processing controlled on the first screen;
      cause the screen to transition from the first screen to the second screen while maintaining the first setting that is a setting changed on the first screen; and
      perform a notification that the first setting is changed when the instruction to execute the first processing is received on the first screen, in a case where the transition from the first screen to the second screen is made during a period between when the first change to the first setting is received to when the instruction to execute the first processing is received on the first screen.

2. The information processing apparatus according to claim 1,
   wherein the processor is configured to
      perform the notification in a case where an operation performed by a different user is detected during the period between when the first change to the first setting is received to when the instruction to execute the first processing is received on the first screen.

3. The information processing apparatus according to claim 2,
   wherein the case where the operation performed by the different user is detected is a case where user verification is performed during the period between when the first change to the first setting is received to when the instruction to execute the first processing.

4. The information processing apparatus according to claim 1,
   wherein the processor is configured
      not to perform the notification in a case where the first change to the first setting is confirmed.

5. The information processing apparatus according to claim 2,
   wherein the processor is configured
      not to perform the notification in a case where the first change to the first setting is confirmed.

6. The information processing apparatus according to claim 3,
   wherein the processor is configured
      not to perform the notification in a case where the first change to the first setting is confirmed.

7. The information processing apparatus according to claim 4,
   wherein even in a case where the first change to the first setting is confirmed, the processor is configured to
      perform the notification in a case where a predetermined setting is changed.

8. The information processing apparatus according to claim 5,
   wherein even in a case where the first change to the first setting is confirmed, the processor is configured to
      perform the notification in a case where a predetermined setting is changed.

9. The information processing apparatus according to claim 6,
   wherein even in a case where the first change to the first setting is confirmed, the processor is configured to
      perform the notification in a case where a predetermined setting is changed.

10. The information processing apparatus according to claim 1,
    wherein the processor is configured to
       perform the notification in a case where an identical setting is changed a plurality of times or the instruction to execute the first processing is provided a plurality of times within a predetermined period.

11. The information processing apparatus according to claim 2,
    wherein the processor is configured to
       perform the notification in a case where an identical setting is changed a plurality of times or the instruction to execute the first processing is provided a plurality of times within a predetermined period.

12. The information processing apparatus according to claim 3,
    wherein the processor is configured to
       perform the notification in a case where an identical setting is changed a plurality of times or the instruction to execute the first processing is provided a plurality of times within a predetermined period.

13. The information processing apparatus according to claim 4,
    wherein the processor is configured to
       perform the notification in a case where an identical setting is changed a plurality of times or the instruction to execute the first processing is provided a plurality of times within a predetermined period.

14. The information processing apparatus according to claim 5,
wherein the processor is configured to
perform the notification in a case where an identical setting is changed a plurality of times or the instruction to execute the first processing is provided a plurality of times within a predetermined period.

15. The information processing apparatus according to claim 6,
wherein the processor is configured to
perform the notification in a case where an identical setting is changed a plurality of times or the instruction to execute the first processing is provided a plurality of times within a predetermined period.

16. The information processing apparatus according to claim 7,
wherein the processor is configured to
perform the notification in a case where an identical setting is changed a plurality of times or the instruction to execute the first processing is provided a plurality of times within a predetermined period.

17. The information processing apparatus according to claim 8,
wherein the processor is configured to
perform the notification in a case where an identical setting is changed a plurality of times or the instruction to execute the first processing is provided a plurality of times within a predetermined period.

18. The information processing apparatus according to claim 9,
wherein the processor is configured to
perform the notification in a case where an identical setting is changed a plurality of times or the instruction to execute the first processing is provided a plurality of times within a predetermined period.

19. The information processing apparatus according to claim 1,
wherein the processor is configured
not to perform the notification for a setting changed on the second screen.

20. A non-transitory computer readable medium storing an information processing program causing a computer to execute a process comprising:
performing a control for displaying on a first screen:
a first screen for:
receiving a first change to a first setting of a first processing; and
receiving an instruction to execute the first processing;
a second screen for at least one of:
receiving a second change to a second setting related to the first processing; or
controlling a second processing that is different from the first processing controlled on the first screen;
causing the screen to transition from the first screen to the second screen while maintaining the first setting that is a setting changed on the first screen; and
performing notification that the first setting is changed when the instruction to execute the first processing is received on the first screen, in a case where the transition from the first screen to the second screen is made during a period between when the first change to the first setting is received to when the instruction to execute the first processing is received on the first screen.

* * * * *